United States Patent
Schneider et al.

(10) Patent No.: US 7,055,055 B1
(45) Date of Patent: May 30, 2006

(54) WRITE CACHE FLUSHING METHOD FOR REDUCING DATA CORRUPTION

(75) Inventors: Eric D. Schneider, Plymouth, MN (US); Michael J. Gustafson, Maple Grove, MN (US); Daniel J. Hagler, Golden Valley, MN (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/719,339

(22) PCT Filed: Apr. 24, 2000

(86) PCT No.: PCT/US00/10999

§ 371 (c)(1),
(2), (4) Date: Mar. 5, 2002

(87) PCT Pub. No.: WO00/65447

PCT Pub. Date: Nov. 2, 2000

Related U.S. Application Data (60) Provisional application No. 60/130,814, filed on Apr. 23, 1999.

(51) Int. Cl.
*G06F 11/00* (2006.01)

(52) U.S. Cl. ................... 714/6; 714/7; 714/8; 714/15; 714/16; 714/20; 711/111; 711/112; 711/113; 711/114

(58) Field of Classification Search ............... 714/6–8, 714/15, 16, 20; 711/111–114
See application file for complete search history.

(56) References Cited

U.S. PATENT DOCUMENTS 5,089,958 A  2/1992  Horton et al.
5,255,270 A  10/1993  Yanai et al. ............... 371/10.2

(Continued)

FOREIGN PATENT DOCUMENTS

EP    1091299 A2    4/2001

(Continued)

OTHER PUBLICATIONS

Rodriguez-Rivera et al., Proceedings of the International Symposium on Memory Management, Vancouver, Canada, Oct. 17-19, 1998, pp. 79-85, especially Figure 3 and pp. 82-83—footprint reduction.

(Continued)

*Primary Examiner*—Robert Beausoliel
*Assistant Examiner*—Emerson Puente
(74) *Attorney, Agent, or Firm*—Sonnenschein Nath & Rosenthal LLP (57) ABSTRACT

There is described a method of maintaining a record of changes to data on a recording medium and allowing reconstruction of the state of the medium at a prior time. Various alternative embodiments are provided to enhance and improve this process, including maintaining two copies in RAM of data that are compared to detect corruption prior to transferring to the recording medium, splitting logic protection and viewing, disguising the disk to protect against incompatible software, flushing a write cache by insuring a certain amount of time has passed, flushing a write cache by insuring a certain amount of free time has passed and inserting delays if required, inserting safe points after a drop in the rate of disk activity, inserting safe points periodically, flushing the entire OS cache after detecting the need to establish a safe point for one user, separating out user activity by watching directories and files, or the use of complex linked data structures to implement the engine where such data structures can be substantially reconstructed from sequentially organized tables in the event of corruption.

15 Claims, 2 Drawing Sheets

U.S. PATENT DOCUMENTS

| | | | |
|---|---|---|---|
| 5,297,258 A | 3/1994 | Hale et al. | |
| 5,325,519 A | 6/1994 | Long et al. | |
| 5,331,646 A | 7/1994 | Krueger et al. | |
| 5,339,406 A | 8/1994 | Carney et al. | |
| 5,381,545 A | 1/1995 | Baker et al. | |
| 5,404,361 A | 4/1995 | Casorso et al. | |
| 5,487,160 A | 1/1996 | Bemis | |
| 5,524,205 A | 6/1996 | Lomet et al. | |
| 5,535,188 A | 7/1996 | Dang et al. | |
| 5,557,770 A | 9/1996 | Bhide et al. | |
| 5,598,528 A | 1/1997 | Larson et al. | |
| 5,604,853 A | 2/1997 | Nagashima | |
| 5,604,862 A | 2/1997 | Midgely et al. | |
| 5,628,016 A | 5/1997 | Kukol | |
| 5,640,561 A | 6/1997 | Satoh et al. | |
| 5,659,747 A | 8/1997 | Nakajima | |
| 5,677,952 A | 10/1997 | Blakley, III et al. | |
| 5,717,849 A | 2/1998 | Brady | 395/181 |
| 5,751,936 A | 5/1998 | Larson et al. | |
| 5,761,680 A | 6/1998 | Cohen et al. | |
| 5,778,392 A | 7/1998 | Stockman et al. | |
| 5,794,052 A | 8/1998 | Harding | |
| 5,802,264 A | 9/1998 | Chen et al. | |
| 5,819,015 A | 10/1998 | Martin et al. | |
| 5,835,953 A | 11/1998 | Ohran | |
| 5,835,955 A * | 11/1998 | Dornier et al. | 711/162 |
| 5,893,140 A | 4/1999 | Vahalia et al. | 711/118 |
| 5,933,368 A | 8/1999 | Ma et al. | |
| 5,982,886 A | 11/1999 | Itami et al. | |
| 6,012,145 A | 1/2000 | Mathers et al. | |
| 6,016,553 A | 1/2000 | Schneider et al. | |
| 6,038,636 A | 3/2000 | Brown, III et al. | |
| 6,199,178 B1 | 3/2001 | Schneider et al. | |
| 6,240,527 B1 | 5/2001 | Schneider et al. | |
| 6,263,338 B1 | 7/2001 | Ronstrom et al. | |
| 6,289,416 B1 * | 9/2001 | Fukushima et al. | 711/113 |
| 6,289,446 B1 | 9/2001 | Nilsson | |
| 6,345,283 B1 | 2/2002 | Anderson | |
| 6,363,487 B1 | 3/2002 | Schneider | |

FOREIGN PATENT DOCUMENTS

| | | |
|---|---|---|
| EP | 0751462 B1 | 7/2002 |
| JP | 62-114595 | 11/1988 |
| JP | 01-036972 | 8/1990 |
| JP | 04-165543 | 6/1992 |
| JP | 04-038739 | 8/1993 |
| JP | 07-059861 | 9/1996 |
| WO | WO 91/01026 | 1/1991 |
| WO | WO 96/12232 | 4/1996 |
| WO | WO 98/26353 | 6/1998 |
| WO | WO 99/12101 | 3/1999 |
| WO | WO 99/56212 | 11/1999 |
| WO | WO 00/65447 | 11/2000 |
| WO | WO 01/04801 A1 | 1/2001 |
| WO | WO 01/33357 A1 | 5/2001 |

OTHER PUBLICATIONS

International Search Report of PCT/US00/10999, Sep. 1, 2000.

Hultgren, C.D., "Fault-tolerant Personal Computers Safeguard Critical Applications," I&CS Instruments And Control Systems, vol. 65, No. 9, Radnor, PA, US, pp. 23-28, (Sep. 1992).

Robinson, J.T., "Analysis Of Steady-State Segment Storage Utilizations In A Log-Structured File System With Least-Utilized Segment Cleaning," IBM Research Division, T.J. Watson Research Center, Oct., 1996, pp. 29-32.

Green R.J. et al., "Designing a Fast, On-line Backup System For A Log-Structured File System," Digital Technical Journal, vol. 8, No. 2, 1996, pp. 32-45.

Castelletto, et al., "DB2 for VSE & VM Archiving and Recovery", IBM VSE/ESA, 1-18, (1996).

Seltzer, et al, "An Implementation of a Log-Structured File System for UNIX," Proceedings of the Winter 1993 USENIX Technical Conference, USA USENIX Jan., 1993, pp. 307-326.

Suzuki, et al, "A Design of a File Manager with History Management Mechanism," Technical Report of Information Processing Society of Japan, Japan, IPSJ, Oct. 29, 1993, vol. 93, No. 96 (93-DBS-96) pp. 75-83. (abstract in English).

Gray, et al., "Transaction Processing: Concepts and Techniques," U.S.A. Morgan Kaufmann Publishers, Inc. 1993, pp. 723-732.

* cited by examiner

Figure 1: Initial State

Figure 2: Write #2 (d2a)

Figure 3: End of write session (safe point)

Figure 4: Write #1 (d1a), #2 (d2b), #1 (d1b), and safe point

Figure 5: Swap first block (#5)

Figure 6: Swap second block (#6 and #7)

WRITE CACHE FLUSHING METHOD FOR REDUCING DATA CORRUPTION

This application claims the benefit of 60/130,814 filed Apr. 23, 1999.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawing hereto: Copyright© 1999, Wild File, Inc. All Rights Reserved.

INCORPORATION BY REFERENCE

The entire application of U.S. patent application Ser. No. 09/105,733, filed Jun. 26, 1998, and entitled "METHOD, SOFTWARE AND APPARATUS FOR SAVING, USING AND RECOVERING DATA" is incorporated herein by reference.

TECHNICAL FIELD OF THE INVENTION

The present invention pertains generally to the storage of digital data, and more particularly to method and apparatus for the backup and recovery of data stored by a digital computer.

BACKGROUND OF INVENTION

In one embodiment of the system described in U.S. patent application Ser. No. 09/105,733, filed Jun. 26, 1998, and entitled "METHOD, SOFTWARE AND APPARATUS FOR SAVING, USING AND RECOVERING DATA" (hereinafter referred to as—U.S. '733—), dealing with redirecting disk writes to preserve the data being overwritten, involved two elements: a circular history buffer system and a main map. The history buffer initially received the diverted newly written data while the main map kept track of actual current location of a given page's data, as viewed by operating system (unaware of the redirection). In the Temp method, as time permitted, swaps were performed to exchange the redirected data and historic "overwritten" data into their appropriate non-mapped hard disk locations. The Always method minimized swapping by redirecting newly written data to alternate physical disk locations in which the data is generally left, thus requiring long term re-mapping.

U.S. '733 envisions that in some situations, the swap activity required in the Temp and Always methods could fall behind the re-cycling of historic data. In other words, the user overwrites so much data that the situation arises where location X contains a very old piece of historic data HD that is awaiting swapping to location Y where it really belongs (for optimal organization—i.e., near related data), and an overwrite of some location with new data ND occurs. Since the new data ND is redirected to overwrite the old historic data HD, which would normally be at location Y but is temporarily at location X, U.S. '733 described a process where ND is written to location X and the maps updated accordingly. This process involves reasonably complex inter-linked maps. U.S. '733 describes the use of stable and transitional pages to manage inter-linked maps under the control of a switch page.

In a perfect world the techniques of U.S. '733 work very well. However, real world experience has revealed a potential weakness in U.S. '733. That is, many personal computers contain buggy code and malfunctioning hardware which results in data corruption.

SUMMARY OF THE INVENTION

According to various embodiments of the invention, there is provided a method of maintaining a record of changes to data on a recording medium and allowing reconstruction of the state of the medium at a prior time. Various alternative embodiments are provided to enhance and improve this process, including maintaining two copies in RAM of data that are compared to detect corruption prior to transferring to the recording medium, splitting logic protection and viewing, disguising the disk to protect against incompatible software, flushing a write cache by insuring a certain amount of time has passed, flushing a write cache by insuring a certain amount of free time has passed and inserting delays if required, inserting safe points after a drop in the rate of disk activity, inserting safe points periodically, flushing the entire OS cache after detecting the need to establish a safe point for one user, separating out user activity by watching directories and files, or the use of complex linked data structures to implement the engine where such data structures can be substantially reconstructed from sequentially organized tables in the event of corruption.

THE PROBLEM OF DATA CORRUPTION

The nature of the buggy code problem involves code that is likely not part of the software implementing U.S. '733 (engine), but other parts of the operating system, device drivers, or applications. A "bug" could include intentional maliciousness by viruses. Regardless of the source of the bug, the result is the corruption of the logic (code) and/or data associated with the engine. Massive corruption does not actually cause the most trouble. Massive corruption tends to render a computer quickly inoperable, and particularly before the corruption has propagated from the computer's internal memory (RAM) to disk. The solution in such a case is to simply restart the computer. Since the disk was not affected, the RAM is re-initialized from the disk's non-corrupted data. However, a little corruption can wreak havoc that is much more serious. A common bug in software is a wild pointer (or array index) which results in the corruption of a few random bytes of RAM (i.e., the location in RAM of the affected bytes is unpredictable).

When code is corrupted, even slightly, the effect is generally catastrophic—code is a sequence of computer instructions of varying lengths (number of bytes). If one instruction is "hit" (altered) by the use of a wild pointer, then not only is this instruction's action altered, but in general, all those that follow it. This is because, if the effect of randomly altering an instruction is to change its length (the number of bytes making up the instruction), then the start of the next instruction is improperly located. Thus, if the computer executes a single corrupted instruction, all the following instructions are typically random junk—parts of other instructions misinterpreted one after another—and the result is to generally render the current process quickly inoperable. Operating systems attempt to isolate processes on a computer (using mechanisms built into the microprocessor's hardware) so that if a process goes awry, its damage can be contained and the process aborted. A common message under Windows 95 is "a general protection fault has occurred" after which some application or component of the operating system is terminated. However, if a vital component of the operating system, such as the engine, is aborted, the entire system for the most part becomes inoperable. Thus, behavior of a computer after a slight corruption of the engine's code is much like a massive corruption—when the affected code is called upon (executed), the computer crashes, and likely before any corruption is propagated to the disk.

Slight Corruption is Worse

The real problem occurs when slight corruption of the engine's data occurs. This is much more dangerous in that it leads to the engine's logic modifying the disk based on corrupted data (in RAM), and thus propagating the corruption to the disk. Once this happens, even after restarting the computer, the engine's data on disk is corrupted. Therefore the essential functions of the engine, from locating where the user's current data has been mapped to its ability to represent an image of the disk as it was in the past, are generally lost. This is in part because the techniques of re-mapping the disk jumble the data on disk and thus without the maps, the data is substantially meaningless.

To make matters worse, the corruption of the engine's data on disk may not even originate in RAM. In real world practice, corruption can be introduced in the communication between the computer's main microprocessor and disk controller. The location to write a page or from which to read one can become garbled, or, the data corrupted in the communication process. Over an extended period of time, a small amount of data stored on a disk can just go bad (a bad page). Or, the use of software that is incompatible with the engine, but has the ability to directly access the disk can corrupt the engine's data (such as a disk "doctor" utility).

Again, it is not the massive hardware failures that are a problem. If a computer's hard disk completely fails to function, there is not much that can be done (from a software standpoint). However, at the other extreme, it is unreasonable to allow a single or infrequent glitch to render all the disk's information unusable when in the majority of the disk's data is intact and, in general, the disk is still mostly functioning.

Controlling the Order in Which Data is Written (Write Cache)

A final interesting problem inherent in the techniques of U.S. '733 is the need to control the order in which data is written to a disk. For example, when making a transition from one stable state to another, transitional data is written (flushed) out to the disk and then the switch page updated. However, modern disk drives, in an attempt to improve their performance, now include write caches. These write caches buffer up writes and actually commit the data to the disk media in a different order than written. This speeds up the overall write process by allowing, for example, the disk controller to actually write data in an order that reduces the movement of the disk head. However, now the switch page may be updated on disk before data that is assumed already present on disk (it is still waiting to be written). In the event of a power failure, the safe transitioning from one stable state to another is rendered useless.

It turns out that there are commands that can be sent to disk drives to disable such write cache optimization. However, these also disable other useful optimization and thus there is a serious performance degradation. Some disks support the use of a flush command to specifically flush out the write cache, but these commands are not easily available. In other words, on a computer of today, there are standard means in the BIOS to reading and writing from a disk, but there is no standard means to flush the write cache. Thus, regardless of whether a computer's disk drive supports a flush command, since the engine uses the standard interfaces of the BIOS, there is no way for the engine to easily initiate flush. It would have to talk directly to the disk and thus have specific hardware knowledge, which from the point of view of a general program that is expected to run on any computer is not possible. The computer manufacturer generally has married a specific type of hard disk with a BIOS that knows how to control this type of disk. All software that follows generally relies on the interfaces provided by the BIOS to talk to the disk—be it SCSI, IDE, or other—and the interface today does not include a flush command. Therefore, without attempting to build in specialized disk (hardware) knowledge into the engine, an improved engine design would facilitate the presence of a write cache without requiring a method of flushing it. This implies the engine must take into account that data written to a disk controller may be actually committed to the disk media in a different order, and notwithstanding, the engine must maintain its data integrity on disk at all times allowing for crash recovery.

The Requirements of a Robust Engine

In summary, an engine must elegantly deal with the data corruption, both in RAM and disk, which occurs from various sources in the computer world. It must avoid propagating corrupted RAM data to its disk based data (e.g., wild pointers). It must recover from infrequent corruption that originates with the disk (e.g., corrupted transfers, misdirected writes or reads, or pages that have gone bad). It must maintain stable data structures and be able to recover them in the event of a crash. even if just prior to the crash, only parts of the data that had been written to disk controller actually made it (other parts were lost, never making it out of the write cache). Without special consideration to these issues, the techniques of U.S. '733 can result in complete data loss due to corruption of the essential engine data.

Before continuing on to the present invention, which addresses these issues, one might ask how today's computers manage to generally function in these conditions. The answer lies partially in a program called ScanDisk, which automatically runs whenever a Window's based computer starts and has reason to believe it did not previously shut down in an orderly fashion. Or, the user can manually launch the program if he or she suspects they have "disk problems." ScanDisk examines the disk-based data structures of the operating system and, to the best of its ability, repairs them.

The main point is that ScanDisk does not reverse damage or return to some previously known good state, but simply corrects and adjusts various links until the operating system's data structures are again usable. Often, some amount of data is lost or corrupted—i.e., parts of files are lost or altered or even entire files disappear. However, there are lots of files on a computer and many are never or seldom used, and therefore a significant amount of corruption can occur before a computer seriously stops functioning. Thus, today computers more or less get "sick" in that over time, various parts of the system slowly get corrupted and it is not unheard of for computer users to periodically wipe their disk clean and re-install the operating system, their applications, and data.

The Promise of Going Back in Time

This process of gradual corruption is inconsistent with the promises of the engine. The engine's goal is to return the disk to exactly the way it was at some prior time, and thus must be immune to gradual corruption that does occur, and which is currently corrected to the best of ScanDisk's ability (or similar repair utility).

In a more perfect world, an operating system would protect the engine and its data from wild pointers and viruses, and with a little attention to data redundancy on disk (to protect against an occasional bad transfer), the techniques of U.S. '733 would suffice. However, operating systems need to be extendable at their lowest levels, and thus it is hard to make them truly protect one device driver from another. Further, an operating system is usually a very large program and as such, it is hard to eliminate every bug from within it.

It may seem that all programs would desire "perfect" protection from another. And in fact the operating system attempts to do so using the hardware means built into the microprocessor (such as interrupts to take control away from a program and memory protection mechanisms to trap stray writes). But at the same time, the operating system must balance protection with the need to be efficient. Efficient code tends not to want to have the burden of protection boundaries (it takes time to constantly protect one task from another). However, the engine is not just another program. Its job, when things go awry, is to allow the computer to restart and everything revert back to some better time. This fall back position must be protected. A user generally perceives a program to run within the whelm of the computer's RAM and expects, or at least desires, that upon restarting the computer, the contents of the disk should be intact. Therefore, it is argued that protecting the engine and disk system warrants special hardware and/or techniques above the compromised level available through the operating system.

The following is a summary of the types of problems an engine must address:
  wild pointer data corruption
  reading corrupted data from the disk (bad transfer, bad page, etc.)
  use of incompatible software that directly accesses the disk U.S. '733 envisioned protecting the engine and its data by special hardware provisions in the main microprocessor (firewall) and/or motherboard, or by actually moving the engine to the computer in the disk controller. This would eliminate the wild pointer problem (assuming the engine was bug free) and prevent incompatible software from directly accessing the disk. However, today there already exist millions of computers for which modifying the hardware is not an option. The present invention offers solutions based on the principles of data redundancy.

Duplication of RAM Data to Detect Corruption

To deal with stray writes through wild pointers (or any other means), the engine of the present invention duplicates all of its major data structures in RAM. For those that correspond to data that is stored on the disk, and cached in RAM, the data's location on disk is included within the data. The critical moment at which corruption can be introduced to the otherwise valid disk image is right before cached data is written back to disk. Therefore, just prior to the write, the two RAM copies are compared to insure they still indicate they are associated with the intended destination on disk, and that their data matches. Should the comparison fail then there is some (RAM) corrupting element at work. Additional techniques could be employed to identify the corruption and correct it, but the best course of action is to alert the user and restart the system. It is felt that once corruption is detected, the system as a whole just cannot be trusted. There is too much chance that further processing will lead to propagating serious corruption to the disk from which there is no recovery. A less drastic response is to block all further attempts to modify the disk, but alert the user and continue to allow the system to run. During this time the user can attempt to save data to an alternate storage device (e.g., save their word processing document to a floppy).

Considering the fact that computers run using large amounts of complex software provided by many different vendors, it is almost assured that stray writes will occasionally occur. The amount of data employed by an engine, considering that it is re-mapping very large disks, is significant (megabytes of RAM) compared to the microprocessor's address space. Therefore, in the absence of hardware protection, there is a reasonable chance that the engine's data is occasionally corrupted. For example, on a microprocessor with a 32 bit address space (4096M) in which the engine uses two megabytes (2M), there exists a one in two thousand chance that a stray write will hit the engine data. However, the probability that two stray writes will hit the two redundant copies of the engine data, and make the same alternation, and that whatever is causing the corruption will not continue on to do massive corruption, is extremely unlikely.

Once the engine validates the two RAM copies against each other, it writes the data to disk. To insure the data was successfully transferred to the disk controller, the engine could immediately read back and verify the data. Both copies are written out to different locations on disk to add a level of redundancy to the disk based data. Therefore, in the future, should the disk fail to retrieve one copy for any number of reasons, there is a second copy available. Insuring data integrity on disk through redundancy is a well-known principle such as used in RAID systems. However, in this case, the redundancy is limited to two copies located generally on the same physical drive.

Splitting Up the Engine

The best solution to protecting the engine and its data has been described here and in U.S. '733 is to provide hardware protection and host the engine on the motherboard (using the main microprocessor) or in the disk controller. It has been argued that because of the substantial RAM and processing time requirements, the ideal location for the engine is on the motherboard (and not the disk controller). However, the engine is really performing two somewhat separate functions: it is managing the reuse of historic data and it is re-mapping the disk. It is through re-mapping that the engine presents to the operating system different "views" of the disk, showing the current image as well as states based on the past. However, should the re-mapping and the views of the disk become temporarily corrupted, this is acceptable as long as the user can restart the computer and be (reasonably) guaranteed that the disk and the ability to go back in time is preserved. The reasoning is this: it does not matter whether it is an application, or the operating system, or even certain parts of the engine that gets corrupted, if the end result is same—the user sees or experiences unexpected results, which can only be "cleared" by restarting the computer.

Thus it is possible to split some of the functions of the engine between an unprotected main processor (and motherboard) and the disk controller. The memory and processing intensive tasks, like re-mapping, are left to the main processor (which has the horsepower) while less demanding logic is added to the disk controller to protect and manage the engine's data structures. The unprotected part of the engine is called the OSfilter and the portion in the disk controller is the called the enforcer. Thus, the main processor based OSfilter handling the re-mapping reads data from the disk controller based enforcer, the information necessary for it to generate and manage the maps used to present various views to the operating system. As data is written by the operating system, it is the enforcer that assigns and insures that the new data goes to alternate locations on disk. However, as the new data is redirected, the OSfilter is informed of the new locations and adjusts its maps accordingly. In the event the OSfilter's data becomes corrupted, the user can restart the computer and the OSfilter rebuilds its data from that provided by the enforcer.

When a disk controller is enhanced to implement the enforcer role, the disk operations that are requested and performed by the disk controller (enforcer) change from the normal read and write page requests. The read request remains unchanged, as there is no reason (*) to protect the engine's data and old historic data from being read. However, the write request now implies that the enforcer will divert the actual write to another location, and inform the OSfilter of this new location. It is the job of the OSfilter to remember that if the operating system, in the future, reads the location just written, it must re-map the location to where the write was diverted. There are various algorithms for determining where to divert a write. These have been discussed in U.S. '733's Temp and Always methods. In both cases, it is likely that the initial location to which a write was diverted will later be updated for performance reasons. This rearranging of the disk is implemented through a swap process. Since this process involves reading and writing current and historic data, as well as updating the engine's disk based data structures, it is implemented in the enforcer.

The user may wish to protect old historic states of the disk from unauthorized view due to security issues. Confidential information on disk may have been deleted or encrypted at some time in the past, and it is important to control access to prior to this time.

The OSfilter may require the storing of its maps on disk, though they can be reconstructed from data provided by the enforcer. Therefore, the enforcer must provide access to some amount of semi-temporary disk space—i.e., the OSfilter saves its data structures on disk but in the event that they appear corrupted, they are rebuilt from the enforcer's protected data. A shut down command informs the enforcer that all of the OSfilter's semi-temporary data has been written out. In the command the OSfilter supplies the location of its root page to its data structures for safekeeping. A special read request allows the OSfilter to obtain "header" information that guides it to the enforcer's read-only data structures from which it can rebuild its maps. This header page includes the root semi-temporary location supplied by the OSfilter just prior to the last shutdown, or is returned null if a crash had previously occurred.

In summary, an enforcer based disk controller would accept, among others, the following basic operations. Additional operations are envisioned such as to support protecting against quickly overruning the history buffer (i.e., insuring some minimum distance into the past is maintained) and locking historic data relating to one or more SOSD images.

read page N, data D returned
    write data D to location X, diverted location Y returned
    request semi-temporary location, location SX returned
    write semi-temporary data D to location SX
    release semi-temporary location SX (or all)
    swap (or move) the contents of locations X and Y
    read header page, data D returned
    disk shut down semi-temporary location SX is root The enforcer validates the swap requests that are made by the OSfilter, as the enforcer has knowledge of the applicable data structures. Thus, although the OSfilter can read and reference the data structures generated by the enforcer, the OSfilter, because it is not trusted, can never make changes or request actions that would invalidate the enforcer's data structures. In other words, the enforcer implements the portions of the engine that insure that overwritten OS visible data is made historic, the historic data is aged and properly recycled, and any re-organization of the disk (for optimization) is done without the possibility of corrupting its own data structures. The OSfilter, on the other hand, implements the rest of the engine, such as re-mapping the disk locations supplied by the operating system to where they are currently located (as controlled by the enforcer).

A disk running in an OSfilter/enforcer mode is unusable by an operating system without the OSfilter to re-map its accesses appropriately. Therefore, when a disk controller is in this mode, it is recommended that it not accept the normal commands (e.g., read or write page). However, it is envisioned that the disk can switch between normal and OSfilter/enforcer modes. When switching out of OSfilter/enforcer mode, all historic data is discarded and the pages making up the main image are moved into their non-mapped locations.

Software Protection in the Absence of Hardware Protection

The OSfilter/enforcer split is a hardware-protected implementation of the engine. As such, it can protect against the use of incompatible software that attempts to directly access the disk. For example, various utilities on the market change the master boot record (MBR) page. This page must be under the engine's control in order to insure the engine (or OSfilter) is properly loaded. Further, if a user boots up on a floppy disk instead of the hard disk, they will not have loaded the engine (or OSfilter) required to view the hard disk. However, with the enforcer implemented in the disk controller, such incompatible software cannot damage the engine's data structures.

Although it has previously been stated that updating the hardware for millions of PCs is impractical compared to releasing new software, it is a less difficult task to introduce a new hard drive. After all, as capacity increases, hard drives are routinely upgraded on PCs. Therefore, providing a hardware solution in the hard drive coupled with new software that runs on the main CPU (motherboard) is useful. Note the "hardware" solution in the hard drive likely consists of modifying its firmware (software).

In the absence of any hardware protection, the engine disguises the disk to avoid incompatible software modifying the disk. It moves the critical OS data structures, like the FAT and partition tables, to new locations and replaces them with data structures that represent a disguised disk. The disguise takes one of two forms: an unusable disk (corrupted beyond any attempt to repair or modify) or an entirely valid but harmless fake disk. In the latter case, the FAT and partition tables represent a very small yet properly structured "fake" disk that is embedded in the overall disk. Since everything about this fake disk is valid, repair utilities should stay within the boundaries of the fake disk. However, the engine knows where the real data and bounds of the disk lie. Since the engine does not rely on any of the data associated with the fake disk, changes made to the fake disk would not corrupt the engine's data structures.

Duplicating Data on Disk to Avoid Loss

Once engine data has been validated as uncorrupted in RAM and is about to be written to disk, the data is written to two different locations. Thus, if the retrieval of one copy fails, there is a second available. The two copies should be written to somewhat distant locations so that corruption in one area of the disk does not cause the loss of both copies. Further, the actual write process should be separated into two independent write requests to avoid both copies traveling from the motherboard to the disk controller in one request. Once the data has made it to the disk controller, it is likely cached in a pending write buffer and actually written out to the disk media some short time later in an optimal manner (minimizing head seek and transfer time).

In some cases it may make sense to only write one copy of a given engine data structure to disk as long as it is known that this data structure could be rebuilt from other duplicated data structures in the event of a disk error. For example, the main area map can be built from the historic data.

Flushing the Write Cache without a Flush Command

Assuming the engine does not have the ability to control flushing of the write cache, the cache poses a difficult problem in the event of a crash. For example, a power failure likely will cause part of the write cache never to be written to disk. The problem for the engine is that some of its data may have been written to disk, and other parts not; but due to the write cache, the order in which data was written by the engine may not correlate to that which made it to the disk. Thus, if the engine writes to disk locations one, two, and three, and then crashes, it is possible locations one and three have been updated but not two.

Since there are few data structures that are fully useful when parts are missing, the present invention uses time aging as a means of insuring the integrity of data written to disk. It is generally assumed that a write cache algorithm will not hold off committing its data to disk for an unlimited amount of time. It is assumed this is true even in situations of constant read and write activity. If this was not the case, then it is conceivable that a file written in the morning would not make it to the disk media even hours later, because the data is stuck in the write cache awaiting an "optimal" time to be written. The present invention builds upon the assumption that upon writing a page to the disk controller, after some minimum amount of time has passed (wait time), it really will be written to the disk media (and so have been saved to non-volatile storage in the event of a crash).

Thus the present invention uses time aging of data, where if and only if the data has been written to the disk controller at least wait time seconds in the past, the data is trusted in the context of a recovery (system restart). Some form of timestamp or time marker is included with a block of data that is written to the disk controller, where a block is made up of multiple disk pages. The block is assumed to have been actually been transferred in its entirety to the disk media if a subsequent timestamp or time marker is found that was written at least wait time seconds later. A timestamp is a value that directly corresponds to a reading of a clock. By comparing two timestamps, it is possible to determine the length of the represented time interval. On the other hand, a time marker simply indicates that wait time seconds have passed since the prior time marker.

Watching the amount of data that has been transferred to the disk controller can be used to approximate a wait time. Since the transfer rate to the disk controller is known, multiplying this by the wait time yields the amount of data that must be transferred after the write of a given page in order to insure this page has really been written to disk media. This assumes continuous transfers are done.

The assumption that after an appropriate wait time data previously written will actually make it to the disk may not hold for certain disk controllers. In such a case an alternate method is used. Here, the engine insures that there has been a sufficient amount of "free time" since a given write for the disk controller to flush its write cache to disk. The engine can monitor the average number of transfers to the disk controller. This is compared to the known or estimated maximum transfer rate (reflecting the rate at which data can actually be read or written to the disk media) to determine if it is reasonable to expect the write cache to have been flushed. If a flush is required, and an insufficient amount of free time has passed, the engine can simply insert a delay (or a series of short delays to avoid a sudden pause in disk activity). The worst case transfer rate of the drive can be inferred from a timing calibration program that reads and writes very large blocks of data (much more than any reasonable cache size). Note that calculations would have to take into account the number of transfers, their relative proximity, and their size, as each independently contributes to the overall transfer rate. In other words, there is a time overhead to physically moving a disk head associated with the start of each transfer and a certain amount of time spent actually transferring the data to the disk's media.

An analogy to the free time method of flushing a disk controller's cache is to imagine the cache as a bucket in which cups of water are added. The bucket has a hole in its bottom that allows it drain at a fixed rate. The water flowing out of the hole is equivalent to the disk controller writing data to the disk media. The process of adding cups of water is equivalent to writing data to the disk controller. If the bucket is full, then you have wait. Reading data from the disk controller is equivalent to momentarily plugging the hole—nothing drains, nothing is added, but time simply passes (it is assumed that a read cache is independent of a write cache). Now, the situation of flushing a write cache is much like needing from time to time insure that a given cup of water that has been added to the bucket has drained, but you cannot actually look inside the bucket or detect if water is still draining. Further, when you add a cup of water to the bucket it gets mixed in with those cups previously as well as those that are subsequently added.

The only way to really know that the cup of water in question has really drained is to insure that at some point after adding the cup, the bucket has completely drained for a moment. Determining when, or how to create this event is the challenge, since you cannot see inside the bucket or know if it is still draining. In other words, there is no standard interface to ask a disk controller if its cache has been flushed. The solution is to determine the worst case rate at which water drains from the bucket. This is done by a test in which you add cups of water as fast as possible until you are forced to wait, since the bucket has become full. After this point, you continue to add cups as the bucket empties (and will accept another cup) and you measure the rate. This process has effectively defeated the "buffering" effect of the bucket and you are now measuring the actual drain rate (or rate at which the disk controller can empty its cache).

With the knowledge of the rate at which the bucket drains, you can monitor the rate at which you add cups of water. When you add a cup that you wish to insure has been drained, you need to slow the rate of future additions such that the bucket is draining faster than you are adding new cups. At some point that can be calculated, the bucket will completely drain, notwithstanding the fact that you are continuing to add cups, be it slowly. Of course, if you need to relatively immediately insure the bucket has drained before adding even one more cup, you can simply wait the calculated time it takes to drain the bucket. In fact, by continuously monitoring the rate of additions to the bucket, one can even have some sense of how full the bucket was at the time of adding the cup that need to be drained. This allows you to reduce the delay. Of course, in this environment of approximation, plenty of fudge must be added (e.g., if you think it takes one second to completely drain, then you wait two seconds to cover for any slight error in calculations).

This water bucket analogy represents the free time method of flushing a write cache. Note that the rate at which the bucket empties is equivalent to how fast the write cache is flushed, which is a function of the seek time and transfer rates. Therefore the disk proximity of the data in the write cache—the locations of where it should all be written on disk—greatly impacts the time it takes to flush the cache. In other words, to write a lot of data to one region on the disk media takes far less time then writing small bits of data across the entire media. However, it is the latter case that can be timed and used as a worst case flush rate, acknowledging that the actual rate in general will be much better. Since one cannot guess what data is written first from the cache by a disk controller, it is not possible to monitor the page locations written to the disk controller and estimate the seek time to transfer time ratio, and thereby dynamically generate an estimated current flush rate.

Returning to the issue of the disk controller, the next question is when, generally, would a delay be inserted to insure the write cache is flushed. There is the process of diverting writes. In general, the user can only select points in time to access at which there was a lull in disk activity (safe point). This avoids accessing data from the past that was in the process of being modified. Thus as long as the lull is sufficiently long, the flushing of the write cache is inherent in the identification of safe points. When restarting a computer after a crash, the user has the option of reverting to a prior time, which will be a safe point, or simply using the disk in the state just prior to the crash. In the later case, the engine is recovering its data structures to a point in time where there may not have been a lull in disk activity. In other words, the crash occurred in the middle of a long sequence of disk activity. If the wait time based flushing method is used, all data written up to wait time seconds before the crash will be present. However, if the disk controller cannot be trusted to actually write data to the disk media after wait time seconds, then the engine has no recourse but to discard all data written prior to the last recorded flush time marker in disk activity. In other words, as the engine determines that a sufficient amount of free time has passed to insure a block of data will have actually been transferred to the disk media, the engine writes out an appropriate time marker. Once this marker has made it to the disk media, the block's validity is established. On recovering from a crash, data that was written to the media but for which no subsequent time marker was found is discarded as parts of the data may be missing. In practice, a user is generally not interested in data that was in the process of or had just been written out at the time of a crash, and so discarding of this data is not a problem.

Another type of engine activity that requires flushing is when the contents of the disk are being rearranged (swapped). This process involves distinct transfer steps that are assumed, at specific points in time, to be flushed to the disk in order to make the process crash proof (the process can resume in the event of a crash without loss of data). It is possible there is a lot of data to move and thus many points at which flushing must be done. Thus, it is during this activity that delays might be required at specific points to insure that writes have actually made it to the disk.

A simple example of a reasonably efficient swap process would involve the use of a fifty-megabyte swap region. At one megabyte per second average transfer rate, it would take fifty seconds to write all this data. If the disk controller had a one-megabyte write cache then it would take one second of free time for the cache to be flushed to disk. Therefore, at some point after writing the fifty-megabyte swap region, a (cumulative) one-second delay in disk transfers to the disk controller is inserted in order to insure the one megabyte cache is flushed (at one megabyte per second). The ratio of fifty seconds of swap region writing to one second of delay is reasonable (a two percent performance hit).

Note that an important aspect to making this ratio reasonable is that the amount of data written between points at which it must be known flushed to the disk can be large (in the last example, fifty-megabytes was used). On the other hand, if only one megabyte was to be written before a flush was required, then the ratio between time spent transferring data and inserted delays becomes much less desirable (one second of writes followed by a one second delay, or a 50% performance hit). In any actual implementation, the engine must generously fudge up the delay times, as exact timing of a disk controller is hard to know. The need to have large areas that are written between (effective) flushes dictates an engine design where a given disk location must not require modification, followed by flushing, followed by modification at a rate faster than writing the large areas between flushes, as just described. More about this later, although note that the swap process described in U.S. '733 entailed frequent flushing, the need of which has now been overcome by the present invention.

Swapping is generally done in the background and is interruptible by user requested disk activity. If in the process of swapping, a free time based flush is required, and the user starts a burst of disk activity, the required delay is simply inserted after the user's activity completes.

Other points in time at which the write cache must be flushed are when the history buffer is being rapidly overwritten and the diversion process is suspended and when the system is shutting down. Neither of these events occur with any frequency and thus adding some amount of delay is of no consequence.

The actual method of indicating on disk when a block of data is valid is to write out a concluding flag, such as a timestamp or time marker, after a sufficient wait time or amount of disk activity free time has passed.

Constant Disk Activity and Safe Points

The concept of a safe point is that of a point in time at which everything that reasonably belongs on disk is present (and actually written to the media). This means that any disk based operation, such as saving a file, has completed and all the supporting operating system structures have been updated. At such a point, the system could be abruptly stopped (reset or power removed) and the user would expect to find their data intact upon restarting the computer. In general, the engine uses a lull in disk activity to mark such a point. (Of course, a signal from the operating system to the engine would also suffice.) In a situation where a computer is reset in the middle of heavy disk activity, one cannot count on what has actually been written to the disk media and thus a user typically understands that "all bets are off." There is, however, another situation. This occurs when there is a relatively constant but light amount of disk activity. Such occurs, for example, when downloading a large file using a low speed modem. Further, this activity may be occurring generally at the same time as other activity like the saving of a word processing document (i.e., a user can download and edit at the same time).

In the context of light but long duration disk activity the use of a simple lull (in disk activity) to establish safe points will fail to establish any. This is a serious problem not so much for the data that was being written slowly, but for any unrelated and independent updates that are intermixed. In other words, consider the case of a four hour download, and all the while a user is editing a repeatedly saving a certain file. If their computer crashes, it is important to provide safe points such that much of the download as well as the different versions of the certain file are recoverable.

The present invention therefore employs a more sophisticated means of detecting when safe points should be inserted. Instead of looking for a complete lull in disk activity for some minimum duration, the engine monitors the rate of disk activity. Whenever there is a sudden drop in activity a safe point is inserted. Also, as long as the disk activity rate is below that reflecting a maximum level (i.e., the rate is such that the operating system is likely frequently flushing out its cache), safe points can be automatically inserted (forced) at a reasonable rate. Viewing the disk as it was at a forced safe point will likely yield much of the data written up to the selected time, though some file updates may have been caught midstream.

Forced safe points can also be created after observing a sudden drop in the rate of file open and closes operations processed by the operating system. In either case, forced safe points should be periodically inserted, after any disk write activity, at some minimum time interval to insure some fall back positions (safe points) are always available.

Shared Disks

The prior discussion of safe points assumed a single user computer system where the engine can infer the user's activity from disk activity. For example, when there is a burst of disk write activity, the user is likely saving a file. If you go to the time prior to the burst and view the disk, you see the file before it was updated, and after the burst, you see the file as it was changed. However, in a shared disk environment (e.g., a network file server), the activity of the two or more users is blended together in the overall disk activity. There is no way to identify system wide safe points, as a lull in one user's disk activity may occur in the middle of another user's activity. Thus, in order to support multiple users, there must be some means of separating out each user's activity and insuring it is flushed to the disk after their activity ceases. Further, it is not desirable to allow one user's heavy use of the disk to greatly reduce the recovery ability for all users. Thus, from the user's standpoint, it is desirable that each user has their own independent history buffer.

A major difference between a single user computer system and a shared disk system is that reverting a single user system back in time is often a good solution to solving a problem that has recently been introduced, but whose nature is not really understood. In other words, if a user's computer is not working now, but was working a hour ago, the easiest course of action is to revert to an hour ago and then recover any desired files that were modified during this discarded hour. However, in the context of a shared disk, one would not want a user to revert the entire system back in time to solve a problem only they are experiencing. In a shared disk environment generally the system is working properly and users have the need to recover specific files or directories. However, if a system, single or shared by many users, gets corrupted such that it no longer functions, reverting the entire system back in time is the good solution. In a shared environment, it assumed the operating system periodically flushes its internal data structures describing the organization of the disk (from RAM to the disk) so that reverting to some point back in time yields a substantially usable system. Under Windows NT, for example, the engine can initiate the flushing the OS cache (the operating system cache being different than the disk controller's cache) to insure that this process occurs at some desirable rate.

Reverting a shared disk to some point in the past, which affects all users, is useful primarily when the system has a whole has been rendered inoperable. This may occur, for example, when major software upgrades or updates are performed.

Outside of a shared disk system becoming inoperable, the act of reverting the entire disk is not useful. Instead, users may wish to revert (restore) certain files and directories. This leads to the need to separate the user's activity and insure their data is flushed from OS cache. In other words, take the example that one user modifies a file and the changes go into the OS cache, and then another user does a lot of file I/o such that the OS cache is not flushed, and then the original user again modifies the file. All of this activity will never have been written to the disk and therefore there is no way to restore, for example, the first version of the modified file based on what was written to the disk.

The solution is for the engine to monitor the users' activity, separating one user from another, and when it appears that a given user has finished a series of file changes, these changes are forced to be flushed from the OS cache. It may turn out that it is difficult to separate out what data in the OS cache is associated with which user, particularly considering some data may have been modified by more than one user. A solution is to simply flush the entire cache at points corresponding to the need to establish a safe point for one user, even if other users are in the middle of making changes.

The next question is how does one isolate file activity of one user from another. If the engine hooks into the operating system at a level such that it sees each file request and the user from which it originates, it can easily look for lulls in activity independently for each user. When a lull is detected, the entire OS cache can be flushed and a safe point for the specific user established.

If there is no way to hook into the operating system at a level to associate individual users with the file requests, then the next best method is to watch the frequency of access to files and directories. One could look for a lull in access to non-shared directories. One could also keep a list of files that have been modified. If some minimum time has elapsed since the file was last modified, and now another request to modify the file occurs, the OS cache could be flushed and a safe point established before the new request is processed. This would insure the file's prior state could be restored, if required. This forced safe point would naturally only be generated when multiple users' activity is overlapping. If a user's activity occurs as a burst without overlapping another user's activity then the flushing and creation of a safe point occurs naturally in the lull that follows the user's burst of activity (i.e., this is the single user scenario). If so many files are being modified that the engine cannot keep track of them all, it can simply force flushing and a safe point, and start over with its tracking. In other words, it never hurts other than in performance, to have more safe points than required. On the other hand, it is important not to miss a safe point, since this implies the user cannot return to the corresponding point in time.

The separation of users' activity using the method of forcing safe points when a specific file is about to be modified a second time, and after some minimum time has elapsed since the first modification, is indirect. The engine is simply insuring that safe points exist to reasonably separate out the different versions of files, which implies the separation of users' activity. There will be more safe points than required for any individual user, but each user will pick out from the overall set of available safe points those associated with their own activity.

A Simple Reconstructible Mapping System

Returning to the issue of corruption of the engine's data structures, U.S. '733 described (though did not mandate) the use of complex data structures for which the loss of some of the data can lead to the loss of all the data. For example, if a tree data structure is used to re-map the disk and a portion of the tree (node) is lost, the entire tree can be rendered unusable. Since the tree describes where the user's data is really located on disk, without the tree the user's data is effectively lost (or more precisely, scrambled).

U.S. '733 described the use of history headers and a main area map. Although the Temp method in U.S. '733, as time permitted, swapped historic and main area data into their appropriate locations, it was possible that unswapped historic pages would be reused. They could contain new main area data, or internal engine maps, or basically most any type of data managed by the engine. Consider the case of a disk with some location, say 10, containing the data AA corresponding to the OS visible location 10 (no mapping required). Now the user overwrites this data with BB and the engine diverts the data from location 10 to 50. Location 10 now holds the historic data AA. In time, the historic data AA becomes very old as more data is modified and new historic states maintained. Eventually location 10 becomes the oldest historic data and therefore the next location to re-use for whatever purpose is needed by the engine, such as a node in a map, or to receive a diverted write. The point of this scenario is to illustrate how the described Temp method leads to the storing of all sorts of data types across a disk's media (i.e., intermixed with the user's current image data).

Now we introduce the problem of uncorrectable corruption, caused by some unknown source. The techniques previously described how duplicating data on disk and in RAM, and careful validation to detect RAM corruption before it propagates to the disk will substantially reduce the likelihood of corruption, but it may occur anyway. If the data structures involve links, where for example, page A contains data that points B, and B contains data that points to C, the loss of page B's data means that C is also lost. Thus, the corruption of a complex link-based data structure is generally catastrophic.

On the other hand, a data structure that is naturally resistant to partial corruption is a sequential sequence of pages. For example, if page locations #5, #6, #7, and #8 contain the ASCII text of a document, and page #6 gets corrupted, one can still retrieve part of the text from page locations #5, #7, and #8. On the other hand, if part of the data in page #5 indicated the location of the next page, and this page was found to be corrupted, there would be generally no way to retrieve the rest of the document.

Figure 1:
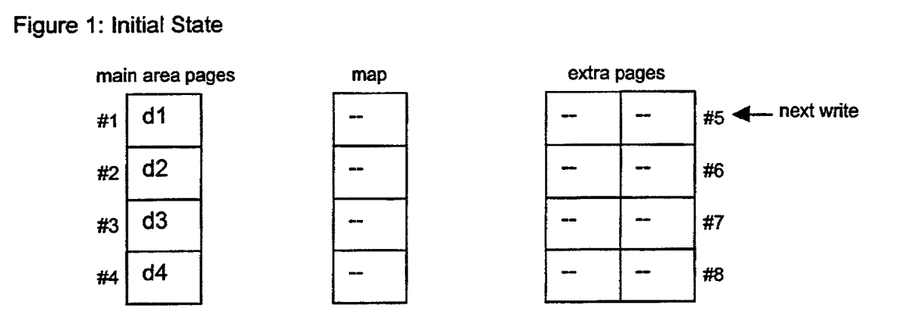
FIG. 1 illustrates the initial state of a New Temp method according to the present invention.
Figure 2:
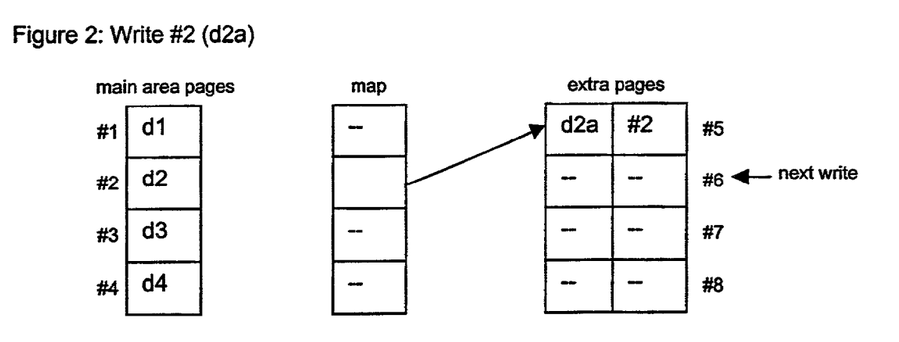
FIG. 2 illustrates what happens after the operating system writes the data "d2a" to location 2 in the example of FIG. 1.
Figure 3:
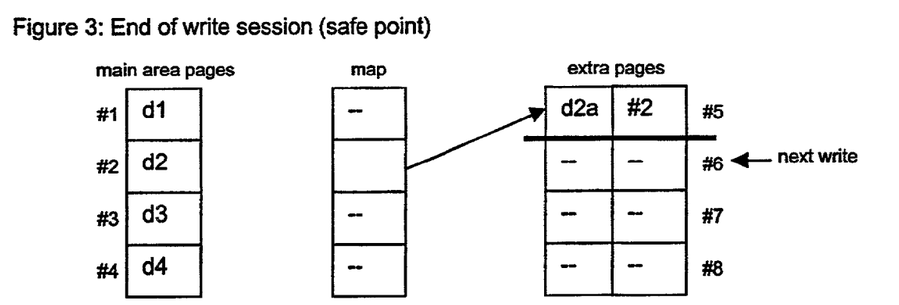
FIG. 3 illustrates a safe point being established according to one example embodiment of the invention.
Figure 4:
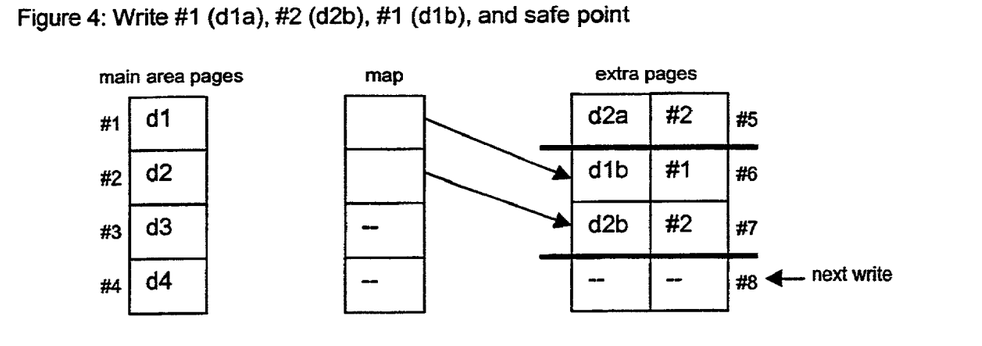
FIG. 4 illustrates three more writes according to one example embodiment of the invention.
Figure 5:
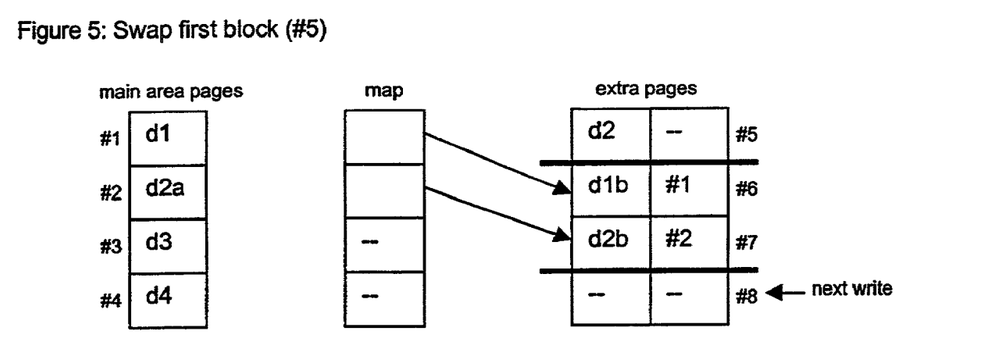
FIGS. 5 and 6 show swaps being performed where diverted and historic data are exchanged and the map updated accordingly, according to one example embodiment of the invention.
Figure 6:
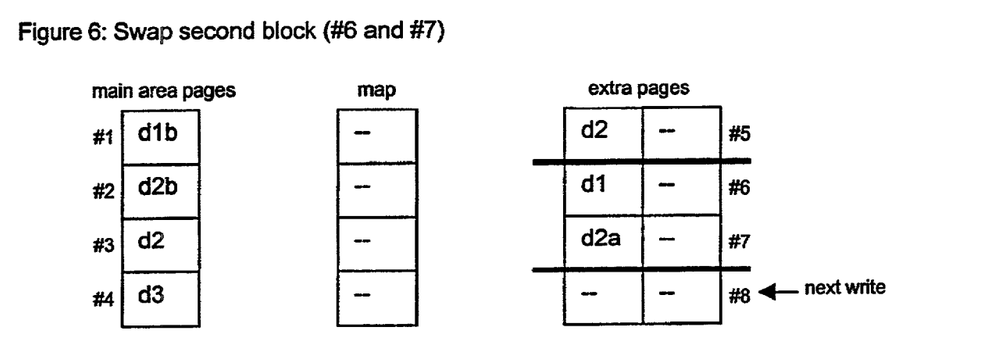

Therefore, the present invention adjusts the data structures and processes described in the Temp method based. FIG. 1 illustrates the initial state of a New Temp method. Here you see a set of main area pages, a map, and a set of extra pages and history headers (the two columns located right next to each other). FIG. 2 illustrates what happens after the operating system writes the data "d2a" to location 2. The write has been diverted to an extra page and a note made in the corresponding history header indicating where the data belongs (location 2). Also note the main map has been updated to indicate where the operating system's location #2 is really located. In FIG. 3 a safe point is established. FIG. 4 illustrates three more writes. Note that one can directly overwrite data and not preserve prior states when a page is modified that is part of the current group being formed, as bounded by safe points. In FIG. 4 location #1 is written twice with the final state being saved in the extra page areas. FIGS. 5 and 6 show swaps being performed where diverted and historic data are exchanged and the map updated accordingly. (The pages involved in any given swap cycle do not have to correspond to safe point boundaries.)

At first glance these data structures and processes are much the same those described in the Temp method. However, this New Temp method does not allow the next write location in the extra page/history header tables to advance into unswapped data. Thus, if the swapping in FIGS. 5 and 6 did not occur, the engine could not continue the algorithm just described. It is hoped that there are sufficient extra pages and corresponding history headers to absorb any burst of write activity, with subsequent time available to perform swapping, so that the overrun condition is rare. However, if an overrun does occur where so much data is rapidly written (and diverted) that there are no available post swapped extra pages then the engine shuts down. This involves informing the user (if possible) that all historic data is about to be lost and then proceeding to write data to wherever the main map last indicated. Eventually, when free time does occur, swaps are performed and then the history headers reset (reinitialized to indicate there are no saved historic states).

The New Temp method differs from the original (old) in that it can be forced to shut down. The original method could go on and on, without any swapping, with a form of fragmentation occurring. In time, as the user continues to write without free time for swapping, the writes are diverted to increasingly fragmented locations. The reality of this performance hit was such that the original method would also do a shut down, preferring the limit fragmentation and responsiveness at the cost of giving up tracking historic states. The argument was that if the user is rapidly changing so much data that only very recent changes can be reversed, this is of little use. Therefore it is better to shut down and run faster.

Given that both the new and old Temp methods shut down, the difference is that the new method shuts down sooner. However, the non-wrapping of the next write location into unswapped data simplifies the data structures. Now, if at some point the main map is lost, it can be easily reconstructed from the history headers. In the old Temp method, the main map could come to indicate that two main area pages are in each other's desired location, and thus require swapping.

Because of this condition, one could not lose the main map without losing vital swapping information. However, this condition cannot occur in the new Temp method and thus the main map is simply an optimized method of determining from the history headers where a given OS visible page is really located, and so can be rebuilt from the headers.

The recovery process in the event the main map is lost simply involves locating the last position of the next write pointer, resetting the main map, and cycling through the history headers. As each header is processed, the OS visible location that is being mapped to its corresponding extra page is add to the main map. Depending on the direction of movement through the headers, duplicates are either taken, overwriting the prior link in the main map, or discarded. For an example, return to FIG. 4 and discard all the links in the main map. Start at the next write pointer and move upward. The first encountered history header indicates location 2 should map to "d2*b*" and the next indicates location #1 should map to "d1*b*". The last header is a repeat of location #2, and since because we are moving backward in time through the headers, the duplicate is ignored since the main map reflects the most recent user writes. The main map has now been rebuilt. In fact, this example illustrates that the history headers could play the role of a main map, in that for each OS visible disk access the map could be scanned to see where the reference should really be directed. However, scanning a huge table for every disk access is highly inefficient and therefore calls for constructing a second more optimized lookup means.

The main map is likely a complex linked data structure (like a tree) and is discarded and rebuilt upon finding corruption. If a portion of the history headers is corrupted, then the result is either lost historic states or the loss of recently written new data (which had not yet been swapped with its overwritten historic data). In either case, assuming the amount of corruption is limited, it is very likely that most of the user's data is intact and usable, and much of the historic states are still usable. In the case where unswapped pages are lost the user can be informed that corruption has occurred, and he/she should validate and backup or restore any desired files. The condition of corruption indicates the user's computer has serious problems.

The sequential or table like nature of the extra pages and history headers facilitates substantial reconstruction, and virtually eliminates the likelihood of a catastrophic user data loss due to the loss of key portions of a complex map.

The sequential nature of how the history headers and extra pages are updated as the user writes data easily fits into the previously described method of time aging data to insure it has been flushed through any write cache. In other words, as the user makes changes, data is written following and advancing the next write pointer into the history headers and corresponding extra pages. It is easy to embed time aging notes to identify any areas that were in the process of being flushed from the write cache at the time of a crash.

The other major process of the engine, the reorganization or swapping of data on the disk can also be easily implemented to support time-aged flushing. Instead of providing a single swap area and using a switch page to control transition states, a table of swap areas is established. In this way, a series of swap cycles can be initiated, and while data for one phase of a pending swap cycle is being time-aged (flushed and stabilized on the disk), the setup for another swap cycle's current phase can be in progress. If delays must be inserted to accomplish flushes, the use of multiple swap areas at least allows the ratio of flushes to disk activity to be kept optimal (less flushes). The swap phases involve collecting all the data involved in a swap in a swap area and then once this backup copy is safe on disk (and flushed), the data can be moved into place without risk of loss in the event of a crash. See the section on flushing the write cache for more details.

The principles just outlined for the Temp method to address recoverability can just as well be applied to the Always method.

The invention claimed is:

1. A method for determining data validity during data recovery operations, comprising the operations of:
   defining a wait time, the wait time being a period of time that ensures that a block of data written to a write cache of a disk has been written to the disk;
   writing a block of data to the disk using the write cache, the block of data including a first marker related to a time;
   reading the block of data from the disk during a data recover operation;
   examining the first marker of the block of data; and
   validating the block of data if a second marker exist on the disk that was written a particular period of time after the first marker was written, the particular period of time being not less than wait time.

2. A method as recited in claim 1, further comprising the operation of invalidating the data if no other marker exist on the disk that was written the particular period of time after the first marker was written.

3. A method as recited in claim 1, wherein the marker is a time marker indicating that a period of time equal to wait time has passed since a preceding marker was written.

4. A method as recited in claim 1, wherein the marker is a time stamp indicting the time the block of data was sent to the disk.

5. A method as recited in claim 4, wherein the marker is compared to a second time stamp to determine whether the marker was written a period of time not less than wait time prior to the other time stamp.

6. A method as recited in claim 1, wherein a valid block of data can be used in data recovery, and wherein an invalid block of data is not used in data recovery.

7. A method for determining data validity during data recovery operations, comprising the operations of:

defining a wait time, the wait time being a period of time that ensures that a block of data written to a write cache of a disk has been written to the disk;

determining a transfer rate of a disk controller coupled to the disk;

calculating a data valid number, the data valid number being the product of the transfer rate of the disk controller and the wait time; and validating a block of data written to the disk after an amount of data not less than the data valid number has been written to the disk.

8. A method as recited in claim 7, wherein a block of data is only used during a recovery operation if the block of data has been validated.

9. A method as recited in claim 8, wherein a block of data is also validated if a period of time not less than wait time has passed since the block of data was sent to the disk.

10. A computer readable medium containing a computer program product for determining data validity during data recovery operations, the computer program product comprising:

program code for defining a wait time, the wait time being a period of time that ensures that a block of data written to a write cache of a disk has been written to the disk;

program code for writing a block of data to the disk using the write cache, the block of data including a first marker related to a time;

program code for reading a code segment that reads the block of data from the disk during a data recovery operation;

program code for examining the first marker of the block of data; and program code for validating the block of data if a second marker exist on the disk that was written a particular period of time after the first marker was written, the particular period of time being not less that wait time.

11. The computer program product of claim 10 further comprising: program code for invalidating invalidates the data if no other marker exist on the disk that was written the particular period of time after the first marker was written.

12. The computer program product of claim 10 wherein the marker is a time marker indicating that a period of time equal to wait time has passed since a preceding marker was written.

13. The computer program product of claim 10 wherein the marker is a time stamp indicating the time block of data was sent to the disk.

14. The computer program product of claim 13 wherein the marker is compared to a second time stamp to determine whether the marker was written a period of time not less than wait time prior to the other time stamp.

15. The computer program product of claim 10 wherein a valid block of data can be used in data recovery, and wherein an invalid block of data is not used in data recovery.

* * * * *

UNITED STATES PATENT AND TRADEMARK OFFICE
CERTIFICATE OF CORRECTION

PATENT NO. : 7,055,055 B1
APPLICATION NO. : 09/719339
DATED : May 30, 2006
INVENTOR(S) : Schneider et al.

It is certified that error appears in the above-identified patent and that said Letters Patent is hereby corrected as shown below:

Claim 1, at column 18, line 47, please change "exist" to --exists--;

Claim 1, at column 18, line 51, please change "exist" to --exists--;

Claim 1, at column 18, line 58, please change "indicting" to --indicating--.

Signed and Sealed this

Fourteenth Day of November, 2006

JON W. DUDAS
*Director of the United States Patent and Trademark Office*